United States Patent
Sowa et al.

(10) Patent No.: US 10,339,225 B1
(45) Date of Patent: Jul. 2, 2019

(54) SECURE ACCESS FRUSTROM CULLING FOR MULTI USER CAX

(71) Applicant: UNITED TECHNOLOGIES CORPORATION, Farmington, CT (US)

(72) Inventors: William A. Sowa, Simsbury, CT (US); Charles Gregory Jensen, Provo, UT (US); Kurt R. Heinemann, East Hampton, CT (US); Andrew D. Milliken, Middletown, CT (US); Diane K. Emmerson, Canton, CT (US); Joshua Daniel Winn, Ellington, CT (US); Christopher Farnum, Tolland, CT (US); Robert Ivan Yorgason, Provo, UT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 597 days.

(21) Appl. No.: 14/599,946

(22) Filed: Jan. 19, 2015

(51) Int. Cl.
*G06F 17/50* (2006.01)
*H04L 29/08* (2006.01)

(52) U.S. Cl.
CPC .......... *G06F 17/50* (2013.01); *H04L 67/1097* (2013.01); *G06F 2217/04* (2013.01)

(58) Field of Classification Search
None
See application file for complete search history.

(56) References Cited

U.S. PATENT DOCUMENTS

| | | | |
|---|---|---|---|
| 6,295,513 B1* | 9/2001 | Thackston | G05B 19/4099 703/1 |
| 9,779,184 B2* | 10/2017 | Winn | G06F 17/50 |
| 2004/0049294 A1* | 3/2004 | Keene | G06F 21/6245 700/5 |
| 2009/0089254 A1* | 4/2009 | Von Kaenel | G06F 17/30241 |

(Continued)

OTHER PUBLICATIONS

Abdallah, Ali E. et al., "Formal Z Specifications of Several Flat Role-Based Access Control Models", 2006, Proceedings of the 30th Annual IEEE/NASA Software Engineering Workshop SEW-30 (SEW '06), IEEE.*

(Continued)

*Primary Examiner* — Cedric Johnson
(74) *Attorney, Agent, or Firm* — Cantor Colburn LLP (57) ABSTRACT

A computerized method and system for computer-aided design access control is disclosed. The method includes receiving a part definition for a part at a server, the part definition comprising a plurality of components and a level of access required for each component of the plurality of components, receiving a request from a user to manipulate the part, the user being associated with a user access level, verifying the user access level against each level of access required for each component of the plurality of components, and presenting a render of the part to the user based on the part definition, the render comprising each component of the plurality of components where the user access level meets the associated level of access required and a placeholder for each component of the plurality of components where the user access level does not meet the associated level of access required.

7 Claims, 8 Drawing Sheets

(56) References Cited

U.S. PATENT DOCUMENTS

| | | | |
|---|---|---|---|
| 2009/0199177 A1* | 8/2009 | Edwards | G06F 9/5077 718/1 |
| 2013/0144566 A1* | 6/2013 | De Biswas | G06T 17/005 703/1 |
| 2013/0239011 A1* | 9/2013 | Red | G06T 5/00 715/743 |

OTHER PUBLICATIONS

Lindstrom, Peter et al., "Visualization of Large Terrains Made Easy", Oct. 21-26, 2001, IEEE Visualization, IEEE.*

Mensah, Francis et al. "Security Mechanisms for Multi-User Collaborative CAx", Oct. 10-12, 2013, RIIT' 13, ACM. (Year: 2013).*

* cited by examiner

Fig. 4D

SECURE ACCESS FRUSTROM CULLING FOR MULTI USER CAX

BACKGROUND

This disclosure relates to computer-aided technologies (CAx), and more particularly, to visualization of component designs in a computing environment.

CAx software is used to develop tools, parts, assemblies, structures and other components using a computer system during the design, analysis, and manufacturing phases, for example. CAx software may be used by a user or group of users to build, analyze, and manufacture complex elements. CAx software is typically restricted to a single user paradigm, wherein only a single user can edit a model or part file within a CAx software application at a time. The user must exit the file before another user is allowed to access it.

SUMMARY

In one embodiment, a computerized method for computer-aided design access control is disclosed, the method comprising: receiving a part definition for a part at a server, the part definition comprising a plurality of components and a level of access required for each component of the plurality of components; receiving a request from a user to manipulate the part, the user being associated with a user access level; verifying the user access level against each level of access required for each component of the plurality of components; and presenting a render of the part to the user based on the part definition, the render comprising each component of the plurality of components where the user access level meets the associated level of access required and a placeholder for each component of the plurality of components where the user access level does not meet the associated level of access required.

In a further embodiment of the above, the placeholder is a black sphere.

In a further embodiment of any of the above, the render is presented to the user in computer-aided design software at a client computer.

In a further embodiment of any of the above, the computer-aided design software is configured to enable a plurality of users to manipulate the part at the same time.

In a further embodiment of any of the above, the computer-aided design software is provided over a computer network.

In a further embodiment of any of the above, the computer-aided design software is installed on a client computer.

In another embodiment, a computerized method for computer-aided design access control is disclosed, the method comprising: receiving a part definition for a part at a server comprising at least one view frustum access level, each of the at least one view frustum access levels being associated with a view frustum; receiving a request from a user to manipulate the part, the user being associated with a user access level; verifying the user access level against the at least one view frustum access level; and presenting a render of the part to the user based on the part definition and the verifying step, the render including only portions of the part within a view frustum accessible by the user.

In a further embodiment of any of the above, the render is presented to the user in computer-aided design software.

In a further embodiment of any of the above, the computer-aided design software is configured to enable a plurality of users to manipulate the part at the same time.

In a further embodiment of any of the above, the computer-aided design software is installed on a client computer.

In another embodiment, a system for computer-aided design access control is disclosed, the system comprising: a database configured to store at least one user record, the user record comprising a user access level; and a host server configured to receive a part definition for a part comprising at least one view frustum access level, each of the at least one view frustum access levels being associated with a view frustum, receive a request from a user to manipulate the part, verify the user access level against the at least one view frustum access level, and generate a render of the part including only portions of the part within a view frustum accessible by the user.

In a further embodiment of any of the above, the system further comprises a client computer, the client computer electronically coupled to the host computer.

In a further embodiment of any of the above, the host server is further configured to transmit the render to a client computer.

In a further embodiment of any of the above, the host server is configured to generate a placeholder on the render for portions of the part inaccessible by the user based on the access level.

In a further embodiment of any of the above, the placeholder is a black sphere.

In a further embodiment of any of the above, the system further comprises a client computer, the client computer configured to present the render of the part in computer-aided design software.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Current CAx environments enable multiple users to edit, store data, and share design information in the same design drawing or model with other users simultaneously. This environment may be implemented with multiple clients accessing a central server or through peer-to-peer (P2P) connections between clients. Other implementations may include a software-as-a-service model or even a cluster of client computers communicating changes in real-time. In addition, a client/server environment may also be configured to enforce access control requirements for individual parts on a component-by-component basis and/or through culling of portions of part outside of a viewing frustum.

Figure 1:
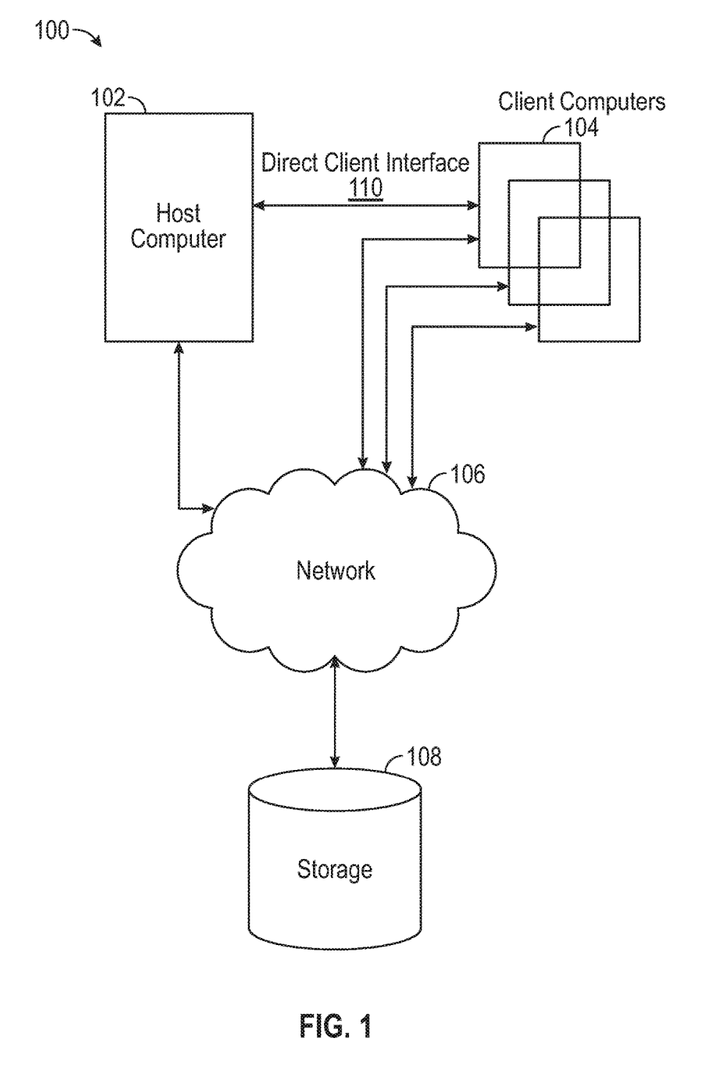
FIG. 1 is an architectural diagram showing components of a system for secure access frustum culling in for multi user CAx according to at least one embodiment of the present disclosure.

FIG. 1 depicts a system 100 for executing a multi-user CAx environment with full access control, according to an embodiment. The system 100 includes a host computer 102. The host computer 102 may include one or more of a computer processor, memory, storage means, network device, and input and/or output devices and/or interfaces. In an embodiment, the host computer 102 may be more than one computer jointly configured to process software instructions serially or in parallel. The host computer 102 is configured to execute one or more software programs.

In an embodiment, the host computer 102 is in communication with one or more networks such as a network 106. The system 100 additionally includes one or more client computers 104. The one or more client computers 104 may include one or more of a computer processor, memory, storage means, network device and input and/or output devices and/or interfaces according to an embodiment. The one or more client computers 104 may be a desktop computer, laptop computer, smart phone, tablet, or any other computer device. In an embodiment, each of the one or more client computers 104 may include an input device, such as a keyboard and mouse, and one or more output devices such as a monitor, speakers, printers etc. In a multi-user CAD environment, each of the client computers 104 is a user workstation capable of accessing and running a CAD environment.

In an embodiment, the one or more client computers 104 are configured to communicate with the host computer 102 directly via a direct client interface 110 or over the network 106. The one or more client computers 104 are configured to execute one or more software programs, such as a computer aided design (CAD) package. In an embodiment the CAD package is configured to communicate with the host computer 102 either over the network 106 or directly through the direct client interface 110.

The network 106 may be a private local area network (LAN), a private wide area network (WAN), the Internet, a mesh network, or any other network as is known in the art. The system 100 additionally includes a storage system 108, such as a part file database. In an embodiment the storage system 108 may be a storage area network device (SAN) configured to communicate with the host computer 102 and/or the one or more client computers 104 over the network 106. In alternate embodiment, the storage system 108 may be located within the host computer 102. The storage system 108 may be configured to store one or more of computer software instructions, data, configuration information, etc.

The system 100 may be configured to execute computer software on the host computer 102, which may be accessed by the one or more client computers 104 using either a thin client application or a web browser executing on the one or more client computers 104. In an embodiment, the host computer 102 loads the computer software instructions from local storage, or the storage system 108 into memory and executes the computer software using the one or more computer processors.

Multi-user CAD systems, such as the system 100 described above, can be utilized by multiple people of varied classifications and nationalities all of whom are working on a single part file at a single time. In some cases, such as military or other government contracts, or for certain commercial components with regard to certain restricted countries, portions of the part being worked on are export controlled, and may not be shown to non-citizens. Similarly, some aspects of the part may be given a certain classification level and only designers who have access to the appropriate security clearances can view those portions of the part. Similarly, portions of a model may want to retain proprietary access and non corporate users may only be given partial access to the models.

In an embodiment, various parts may comprise a number of components and may be designed using a part file to describe them. The part files may be stored in the storage system 108. In order to prevent export violations, clearance level violations, or retain proprietary information, each component of the part in a part file stored on the storage system 108 includes one or more of a data entry for export control and a data entry for security clearance requirements. The data entries include information defining the access level required to view the component.

Similarly, each user is assigned a nationality corresponding to their country of citizenship, and/or a clearance level. In some embodiments, only one of the country of citizenship and the clearance level are utilized. In other examples, additional user access levels can be defined along the same principles.

In some embodiments, the part file may define export control and security clearance requirements related to a view frustum (pyramid of vision) as defined by an eye point and datum plane. In such embodiments, the view frustum defines the accessible or inaccessible portions of the part that will be evaluated by the host computer 102 when rendering the part for the user on the one or more client computers 104. An example of view frustum access control is provided in FIGS. 4A-4D.

A view frustum is obtained by generating a pyramid of vision from a reference point outwards to a datum plane, similar to a person taking a photograph. Dissimilar to a photograph, with CAD software, a rendering of an object defined by a datum plane may be manipulated to rotate the object while still preserving the view frustum.

When a user logs in to the one or more client computers 104, the one or more client computers 104 transmits the user's assigned nationality and clearance levels to the host computer 102. The host computer 102 can then perform a check of the user's nationality and clearance levels and deny access to the user if the currently viewed aspect of the part violates the user's clearance or nationality. The host computer 102 may also only authorize access to a view frustum for the part based on the user's clearance or nationality. Of course, it should be appreciated that clearance or nationality should not be limiting in terms of providing access control. The host computer 102 may perform access control based on any criteria, such as, for example, role-based access control.

In an alternate embodiment, when allowing the user to view the part would violate export controls for only a small subset of components within the part file, or would exceed the user's clearance for only the small subset of components, the host computer 102 can black out, or redact, the components that the user is not allowed to view or limit the user's view a particular view frustum and grey out all other areas. Thus, by way of example, a foreign national can be allowed to work on other, non-restricted aspects of a given part file, despite some aspects of the part file being subject to export controls.

Figure 2:
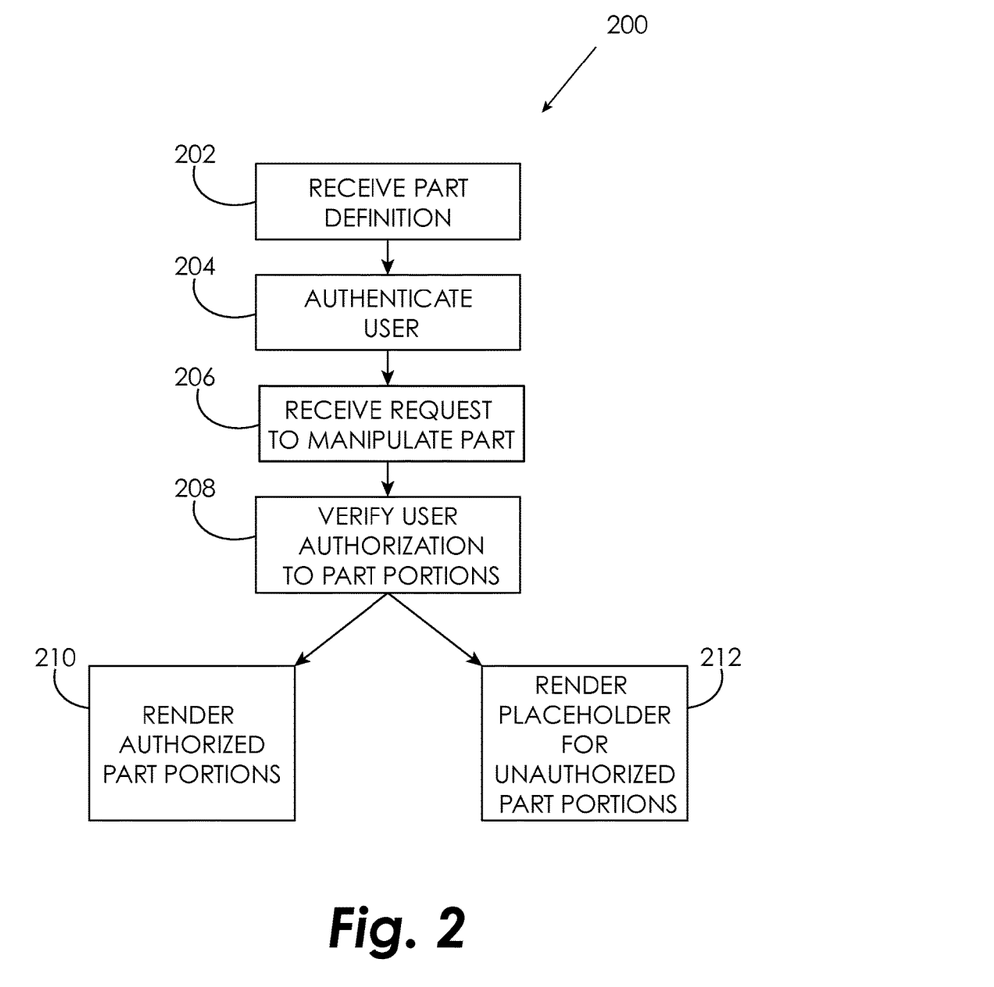
FIG. 2 is a flowchart showing steps in a method for secure access frustum culling in for multi user CAx according to at least one embodiment of the present disclosure.

With continued reference to FIG. 1, FIG. 2 illustrates an example method for defining a part and verifying the clearance level or nationality of a user logging into the one or more client computers 104. Initially, a part definition will be provided to the system at block 202. In this step, a part file or other part definition is received by the system 100 identifying a part for manipulation.

In at least one embodiment of the present disclosure, after one or more parts are received in the system 100 and ready for manipulation, a user logs in to one or more client computers 104 by providing the user's login information at block 204. During this optional step, the user's log in information is provided to the host computer 102, and the host computer 102 verifies the user's login credentials. In some examples, the user's login credentials are verified by a password provided by the user and compared to a stored password at the host computer 102. In other embodiments, single sign on methods may be used such as active directory, LDAP, etc. The user's login credentials further include the user's nationality and clearance level. It should be appreciated, of course, that the user may already have authenticated to the multi-user CAx system and have established a session to verify his or her identify on subsequent use.

After the login credentials have been verified, the system 100 receives a request from the user to manipulate an individual part at block 206. Upon receiving a request by the user, the host computer 102 compares the nationality and clearance levels of the user against the nationality and clearance level flags of all components and parts that are being viewed in the multi-user CAD session which the user is attempting to join in at block 208. If the user's nationality and clearance levels meet or exceed the requirements of the current multi-user CAD session, the user is permitted full access to the multi-user CAD session by the host computer 102 in at block 208 and the entirety of the part is rendered for the user to manipulate at block 210. It should be appreciated that steps 206, 208, and 210 may be performed multiple times in the method 200, such as, for example, in the case where multiple users are attempting to view or edit the same part.

In some embodiments, if, however, the user's credentials do not meet the required credentials, the host computer 102 compares each component in the current session against the user's credentials and allows the user to see any components where the users nationality and clearance level meet or exceed the requirements in at block 208. In some embodiments, the host computer 102 may render a box or other geometric shape over the components that the user is unauthorized to view at block 212.

In other embodiments, if the user's credentials do not meet the required credentials, the part file may define a non-restricted viewing frustum identifying a portion of the part that the user may manipulate with limited access. The viewing frustum may be associated with non-restricted components of the part from an export control or security clearance perspective.

In some examples, the host computer 102 can further provide a message prompt to each of the one or more client computers 104 notifying the other users that a clearance restricted or export restricted participant has joined the session, thereby preventing other users from inadvertently violating clearance or export controls.

Figure 3A:
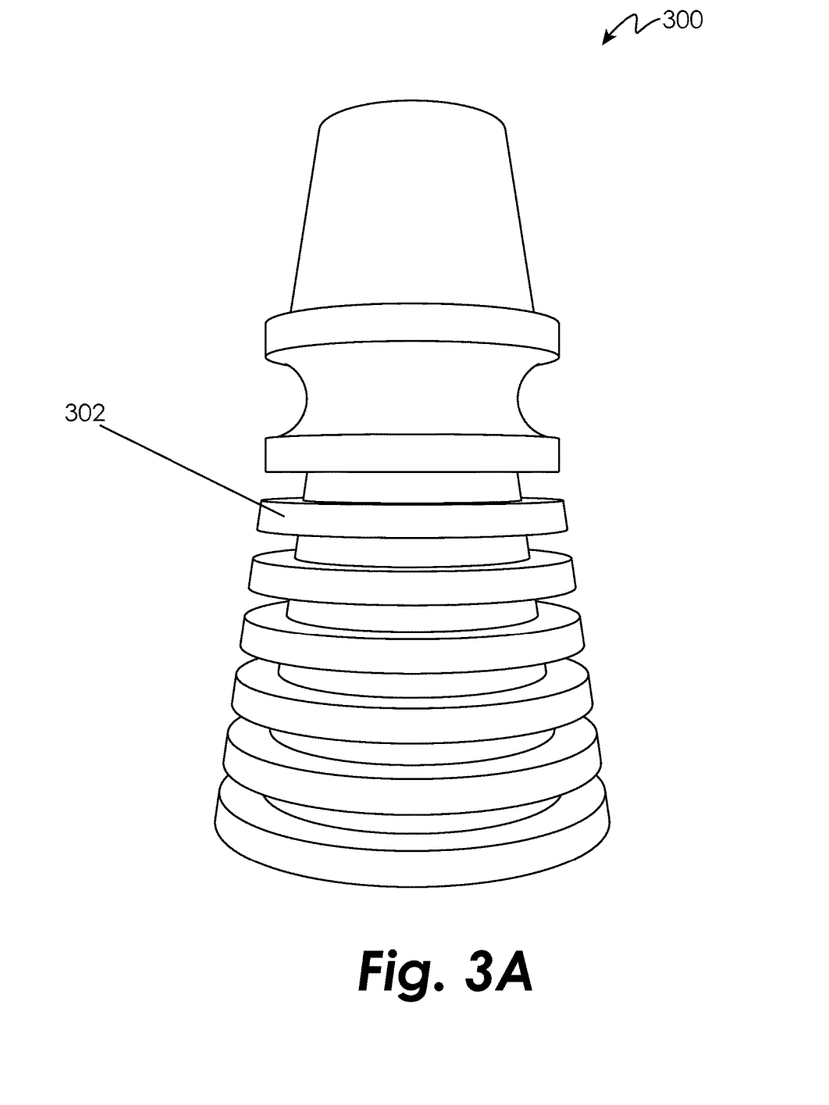
FIG. 3A is a graphical representation of a rendering generated in use with a method and/or system for secure access frustum culling in for multi user CAx according to at least one embodiment of the present disclosure.
Figure 3B:
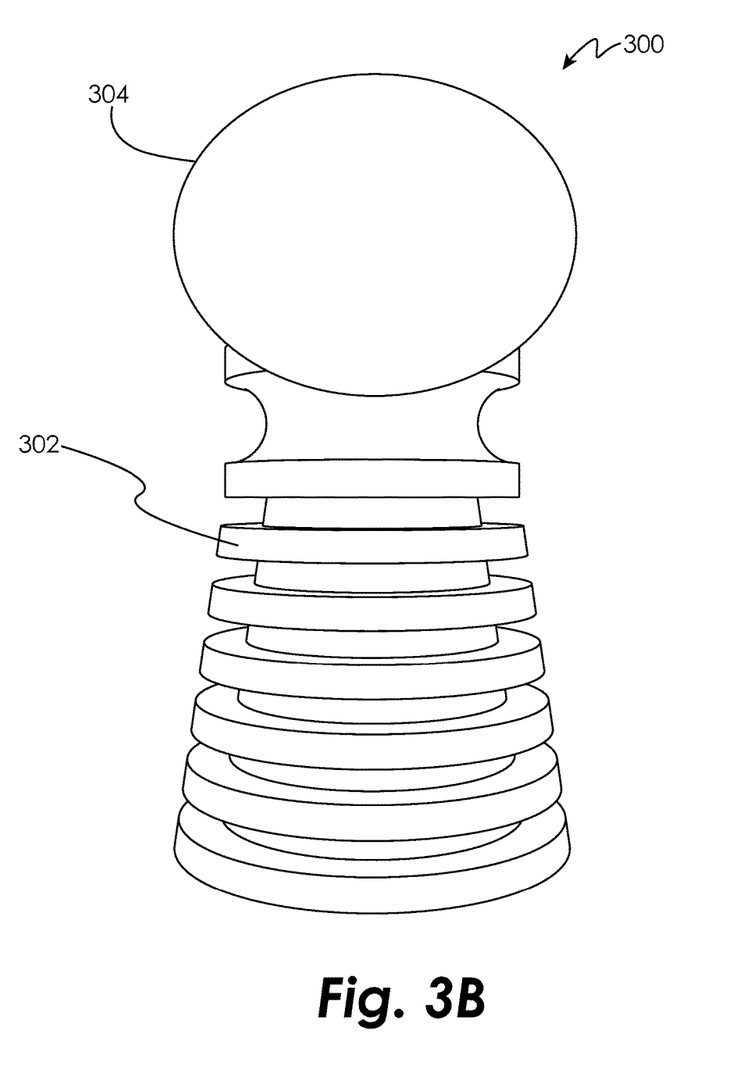
FIG. 3B is a graphical representation of a rendering generated in use with a method and/or system for secure access frustum culling in for multi user CAx according to at least one embodiment of the present disclosure.

An example of part rendering according to at least one embodiment of the present disclosure is provided in FIGS. 3A-3B. For example, FIG. 3A shows the rendering 300 of a part 302. In this example, the entirety of the part 302 is available in the rendering 300 because the user viewing the part 302 has the appropriate access to view the entirety of the part 302. In this example, the user may manipulate the part 302 however he or she needs, including rotating the part 302 and/or adding or deleting components from the part 302.

Alternatively, FIG. 3B displays an example of the same rendering 300 with component-based access control. In this example, the user requesting manipulation of the part 302 does not have full access to the part 302. Accordingly, in the rendering 300 in FIG. 3B, a black object 304 is rendered to restrict the user's access to view a portion of the part 302. In some embodiments, the black object 304 may be a black sphere. It should be appreciated that any placeholder may be rendered over the restricted area. In this example, the user cannot see or edit the part 302 in the area blocked out by the black object 304.

It should be appreciated, of course, that the black object 304 is only one example of the type of object that could be applied to restrict access to the part 302. The black object 304 could be replaced, for example with any object rendered over the part 302 to restrict access to the desired component.

It should further be appreciated that FIG. 3B is a two-dimensional representation of a three-dimensional modeling. The user may manipulate the rendering 300 to move the part 302 in any direction. In addition, as the user manipulates the part 302, the black object 304 is further manipulated to restrict access to portions of the part 302. For example, the black object 304 may be a sphere or other three-dimensional object that further restricts viewing access to the part 302 as it is manipulated.

Figure 4A:
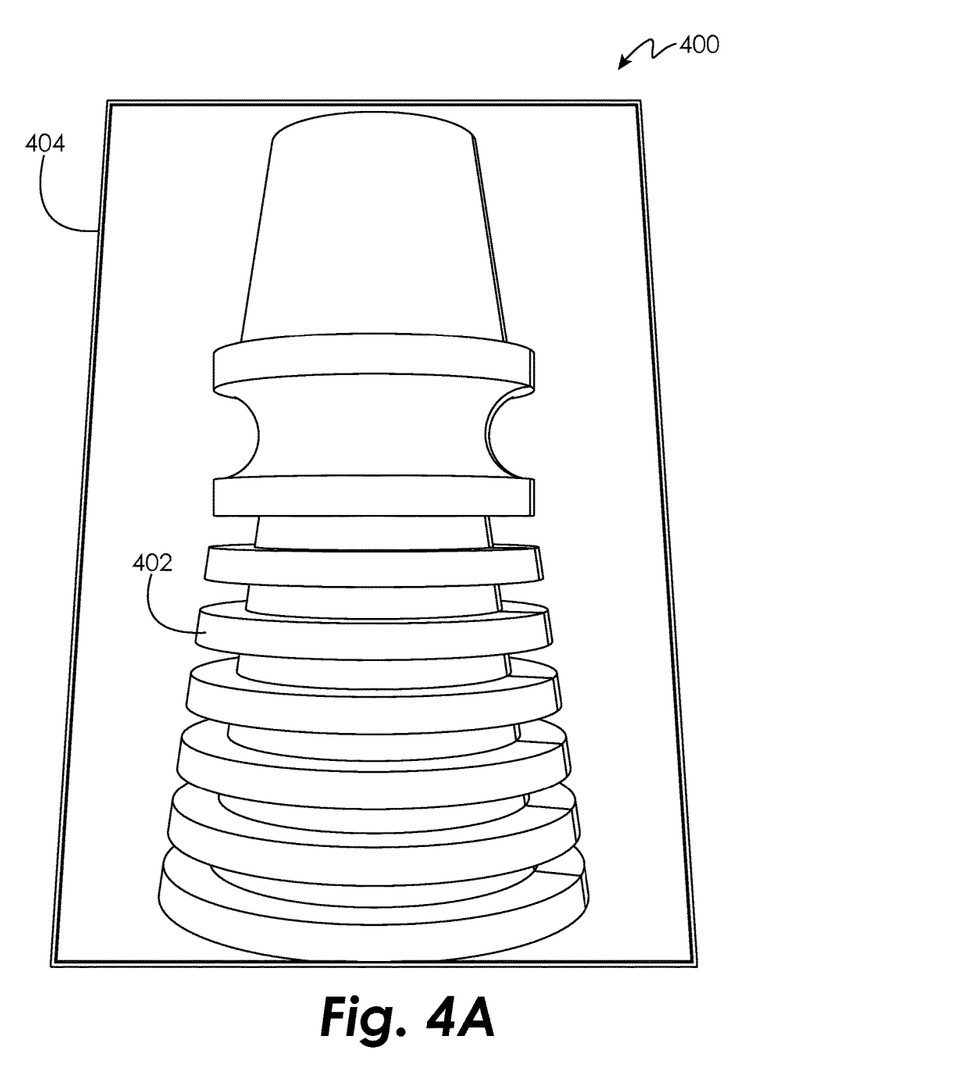
FIG. 4A is a graphical representation of a rendering generated in use with a method and/or system for secure access frustum culling in for multi user CAx according to at least one embodiment of the present disclosure.

An example of a part rendering providing an access control viewing frustum is shown in FIGS. 4A-4D. FIG. 4A displays a rendering 400 of the same part 402 shown in FIG. 3A with the addition of a datum plane 404. In this rendering 400, the datum plane 404 defines an access control area for the part 402. It should be appreciated that the datum plane 404 may not need to be rendered and is shown for illustration purposes.

Figure 4B:
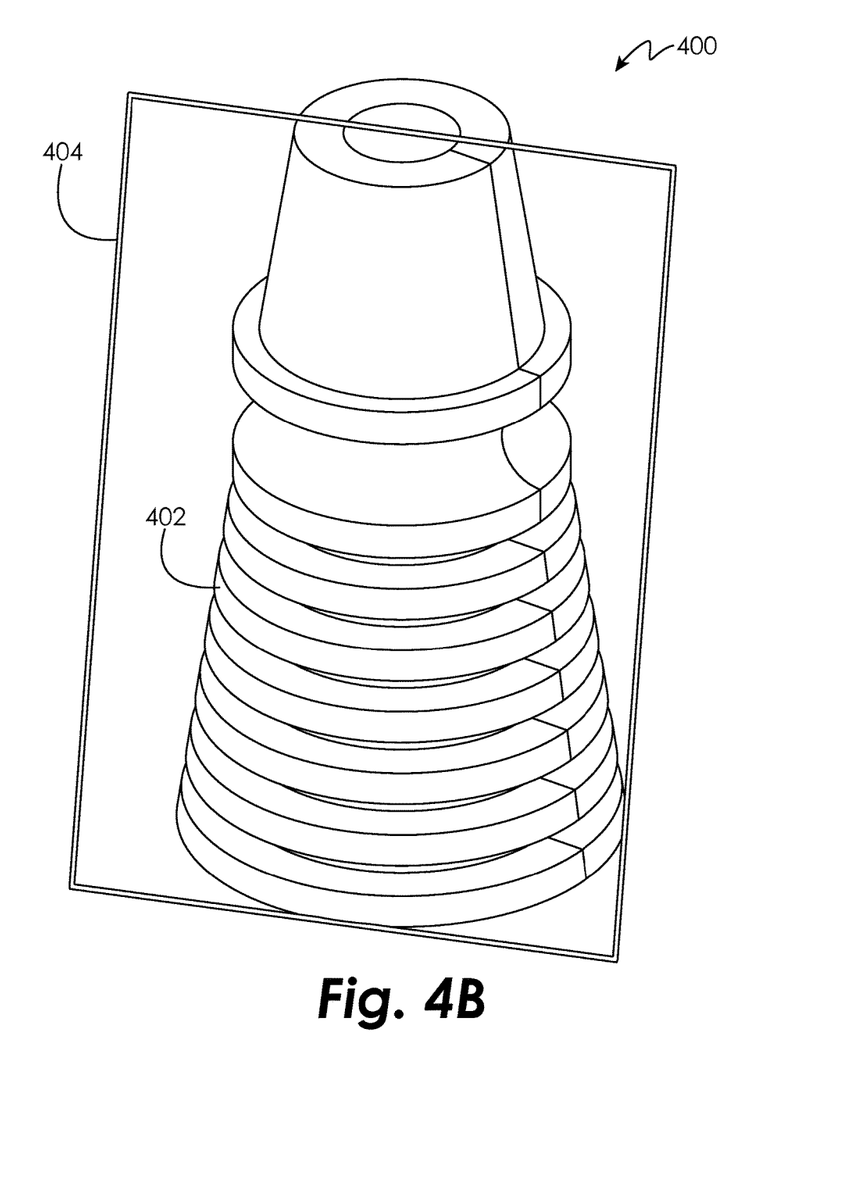
FIG. 4B is a graphical representation of a rendering generated in use with a method and/or system for secure access frustum culling in for multi user CAx according to at least one embodiment of the present disclosure.
Figure 4C:
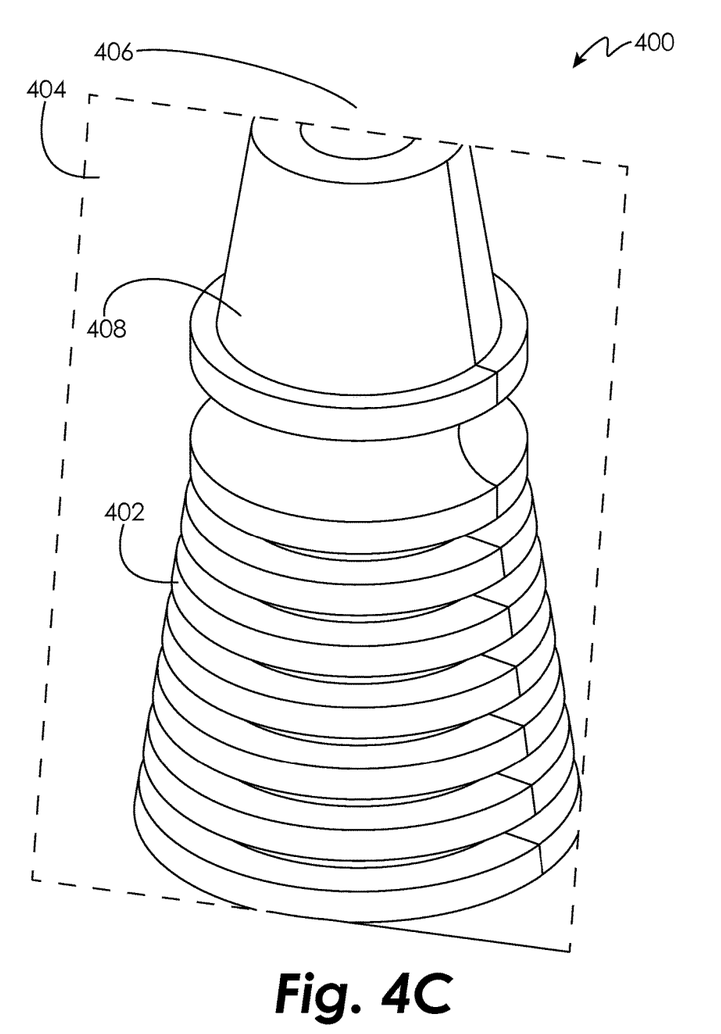
FIG. 4C is a graphical representation of a rendering generated in use with a method and/or system for secure access frustum culling in for multi user CAx according to at least one embodiment of the present disclosure.
Figure 4D:
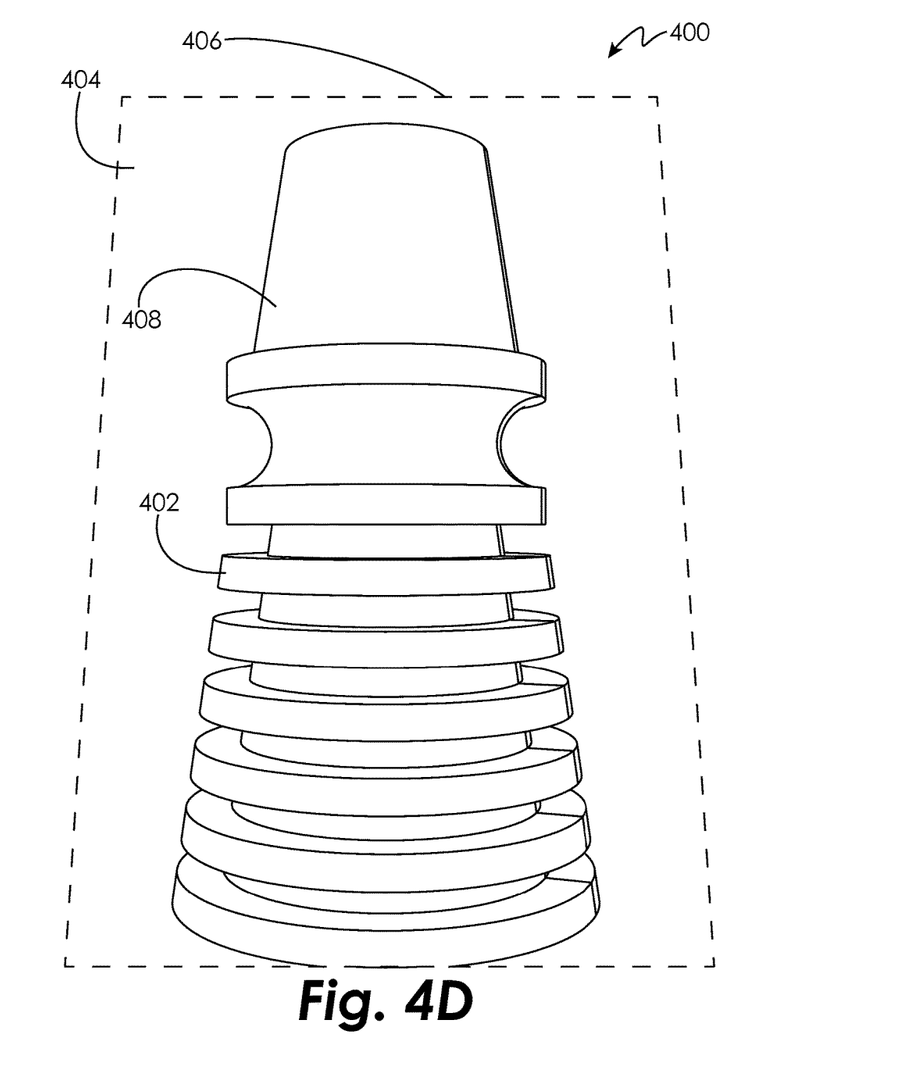
FIG. 4D is a graphical representation of a rendering generated in use with a method and/or system for secure access frustum culling in for multi user CAx according to at least one embodiment of the present disclosure.

FIG. 4B displays the same rendering 400 with the part 402 manipulated to a different view. As shown in FIG. 4B, the datum plane 404 is a two-dimensional plane related to the part 402. In the event that a user requests access to manipulate the part 402, the datum plane 404 and a reference point (not shown) may define an accessible viewing area for the user. As shown in FIG. 4C, the rendering 400 may use the datum plane 404 to render the portions of the part 402 in an acceptable viewing area 408 but not render the other portions of the part 402 in the inaccessible viewing area 406. As shown in FIG. 4C, the entirety of the inaccessible viewing area 406 is rendered in gray. As shown in FIG. 4D, in the event that the user rotates the part 402 on the rendering 400, the datum plane will continue to render the portions of the part 402 in the accessible viewing area 408 and not render portions of the part 402 in the inaccessible viewing area 406.

While the description above refers to particular embodiments of the present invention, it will be understood that many modifications may be made without departing from the spirit thereof. The accompanying concepts are intended to cover such modifications as would fall within the true scope and spirit of the present invention. The presently disclosed embodiments are therefore to be considered in all respects illustrative and not restrictive, the scope of the invention being indicated by the appended concepts, rather than the foregoing description, and all changes which come within the meaning and range of equivalency of the concepts are therefore intended to be embraced therein.

The invention claimed is:

1. A method for providing computer-aided design access control in a computing network executing computer-aided technology (CAx) software, the method comprising a host computer in the network:
   receiving from a plurality of client computers on the network, operated by a respective one of plurality of users, one of a respective plurality of login requests, wherefrom the host computer determines for the users a respective plurality of user clearance levels,
   receiving from the client computers a respective plurality of requests to manipulate at a same time and in real time a rendering of a mechanical part, wherein the mechanical part comprises a plurality of mechanical components,
   accessing, from a part file database, a part file for the mechanical part, the part file identifying (i) the plurality of mechanical components, and (ii) a plurality of component clearance level flags identifying clearance levels for manipulating the respective plurality of mechanical components,
   comparing the plurality of component clearance level flags against the user clearance levels, and
   generating a plurality of access permissions for the respective users to manipulate a rendering of those mechanical components for which component clearance levels do not exceed the user clearance levels, and
   instructing each of the client computers to continuously render at a same time and in real time a respective one of a plurality of composite images that includes:
   (i) those mechanical components for the respective one of the users thereon having access permission, and
   (ii) a visually obstructed representation of those other mechanical components for the respective one of the users thereon not having access permission,
   wherein during simultaneous manipulation of the plurality of composite images on the respective plurality of client computers, the plurality of client composite images continuously provide the visually obstructed representation of those other mechanical components for the respective one of the users thereon not having access permission.

2. The method of claim 1, wherein the generic shape is a black sphere.

3. The method of claim 1, wherein the render is presented to the user in computer-aided design software at the client computer.

4. The method of claim 3, wherein the computer-aided design software is provided over the computer network.

5. The method of claim 3, wherein the computer-aided design software is installed on the each one of the client computers.

6. The method of claim 1, wherein when the user clearance levels mutually differ, the respective composite images are mutually unique.

7. The method of claim 1, wherein the visually obstructed representation is provided by rendering a generic shape or datum plane to obstruct the those other mechanical components for which the respective one of the users thereon does not have access authorization.

* * * * *